UNITED STATES PATENT OFFICE.

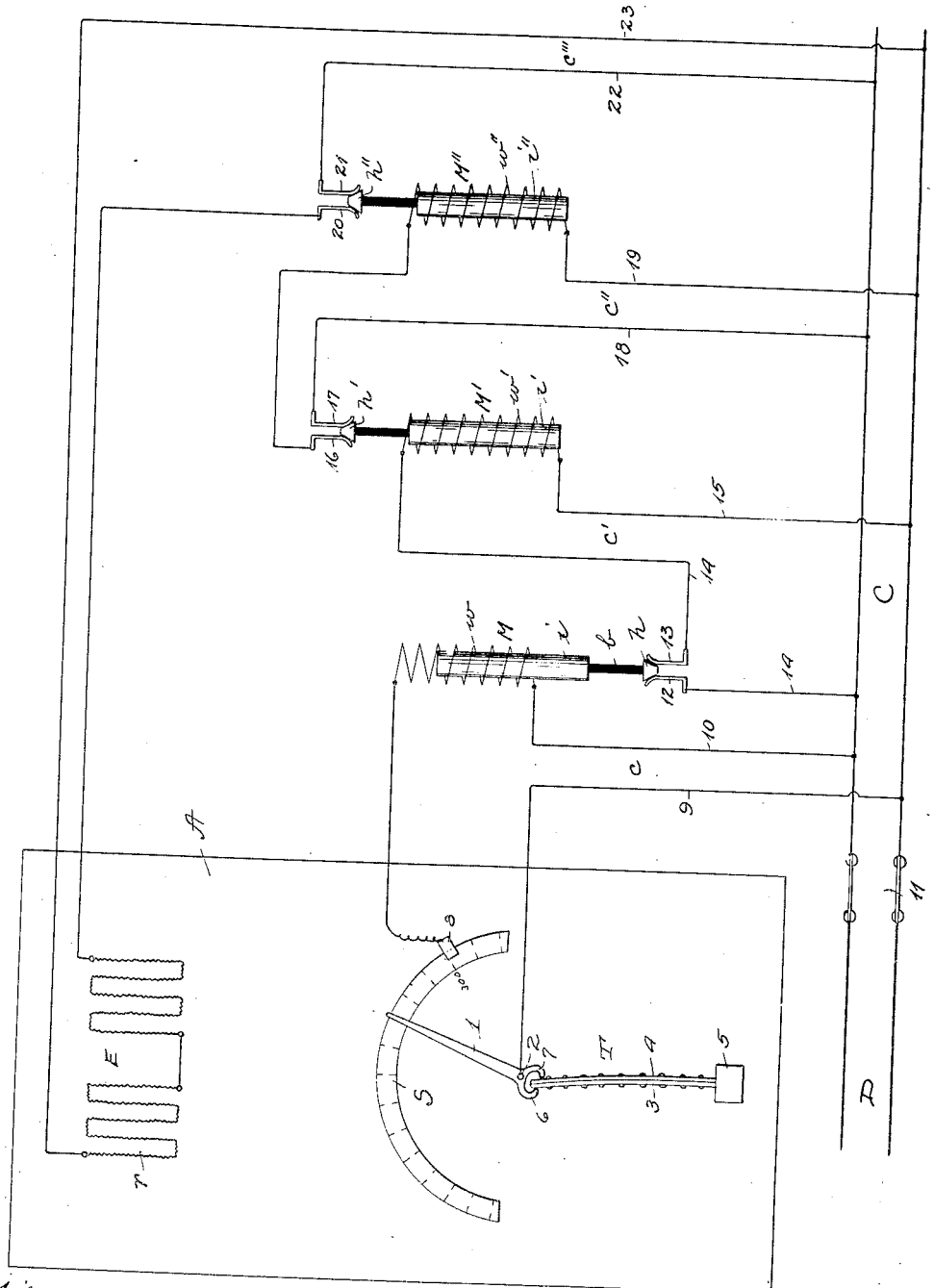

EDWARD H. RUCKLE, OF CHICAGO, ILLINOIS, ASSIGNOR TO HUGHES ELECTRIC HEATING COMPANY, OF CHICAGO, ILLINOIS, A CORPORATION OF ILLINOIS.

TEMPERATURE-REGULATING SYSTEM.

1,171,254.  Specification of Letters Patent.  Patented Feb. 8, 1916.

Application filed March 25, 1915. Serial No. 16,853.

*To all whom it may concern:*

Be it known that I, EDWARD H. RUCKLE, a citizen of the United States, and a resident of Chicago, in the county of Cook and State of Illinois, have invented certain new and useful Improvements in Temperature-Regulating Systems, of which the following is a specification.

My invention relates to temperature regulating systems, particularly adaptable for maintaining the temperature constant in electrically heated devices such as electrical cook or bake ovens, furnaces, or the like.

It is of course common practice to associate a thermostatic device with an electrical circuit to open the circuit when the temperature rises above a certain figure and to reclose the circuit when the temperature again falls. In such systems however, the amount of flow that can be controlled is limited on account of the more or less delicate organization of the thermostatic mechanism.

The object of my invention is therefore to provide a system, preferably electro-magnetic, which is primarily controlled by thermostatic mechanism but which will maintain efficient temperature regulation for any amount of current flow which produces the temperature to be regulated.

In general my improved controlling and regulating system involves a series or chain of electro-magnetic switch devices, one end of which is connected with thermostatic mechanism controlled by the temperature to be regulated, and the other end of which is associated with the electrical circuit which supplies the current for the heat producing devices. The arrangement of the electro-magnetic switch devices is such that each will control the making and breaking of an intermediate circuit through which flows only a proportionate part of the maximum current flow to be delivered to the heat producing devices.

My invention will be clearly understood by reference to the accompanying drawing, the figure of which diagrammatically illustrates an inclosing structure and my improved system for controlling and regulating the temperature within the structure.

Referring to the drawing, A represents an inclosing structure such as a stove, oven, furnace, or the like.

S represents a scale with which an indicator arm 1 coöperates to indicate the temperature within the inclosing structure, this arm being pivoted at 2.

T represents the thermostatic device of well known construction involving two plates 3 and 4 of different expansion coefficient rigidly riveted together and extending from a support 5, the end of the thermostat structure extending between the circular ends 6 and 7 on indicator arm 1. As the thermostat device bends during changes of temperature the arm 1 will be moved along the scale to indicate the temperature within the structure A. A contact block 8 is adapted to be set adjacent the scale in the path of the indicating arm 1, and this block and the pivot of arm 1 form the terminals of a circuit $c$, the limbs 9 and 10 of this circuit connecting with the conductors of the main circuit C, which circuit is adapted for connection with the main supply circuit D by means of a switch 11.

E represents the heating elements within the structure A, which elements are constructed in the usual manner and comprise resistance wires $r$. These heating elements E could be directly included in the circuit $c$ but as the thermostatic mechanism and the temperature indicating mechanism are of more or less delicate construction, the amount of current which can be taken care of will be limited as the arcing between the arm 1 and contact block 8 could not be efficiently taken care of. I therefore include one or more electro-magnetic circuit controlling devices between the circuit $c$ and the heating elements E. As shown, the electromagnet switching device M is associated with the circuit $c$, its winding $w$ being included in limb 10 of this circuit. The core $i$ of electro-magnet M has the insulating bar $b$ extending downwardly therefrom and terminating in a contact head $h$ which coöperates with terminal contacts 12 and 13 of a circuit $c'$ whose limbs 14 and 15 connect with the circuit C.

The contact block 8 is set with reference to the scale depending upon the temperature desired to be maintained in the structure A. In the drawing it is set at the 300 degree point and therefore when the temperature reaches 300 degrees the indicator arm 1 will be in contact with the block 8 and will close circuit $c$, and when the temperature falls below 300° the circuit will be open. When the circuit is open the core $i$ of electro-magnet M is released and its head $h$ connects together terminals 12 and 13 to close the circuit $c'$. When the circuit $c$ is closed the core will be raised and circuit $c'$ opened, and the winding $w$ is of such resistance that very little flow will be necessary to effect drawing in of the core. In practice the current flow necessary will be only a small fraction of an ampere and consequently there will be no harmful arcing between the arm 1 and contact block 8. With such small current flow through its winding the electro-magnet M will of course be incapable of efficiently breaking a very heavy current flow circuit, but it will be able to break a circuit through which say about six or ten amperes flow. If this amount of current were sufficient for the heating elements E, the circuit $c'$ could of course be directly connected with such elements. However, if greater current flow is necessary it is advisable and preferable to introduce another electro-magnetic switch mechanism M', the winding $w'$ of which is included in circuit $c'$ and whose core $i'$ carries the contact head $h'$ for coöperating with terminal contacts 16 and 17 of the circuit $c''$ whose limbs 18 and 19 connect with the respective sides of the main circuit C. The winding $w'$ of electro-magnet M' would be designed to accommodate six to ten amperes which would give the electro-magnet sufficient power to efficiently break the circuit $c''$ with considerable more current flowing therethrough, say fifty amperes. If this current were sufficient for the heating elements E to produce a very high temperature in structure A the circuit $c''$ could be directly connected with the heating elements. However, if more current is necessary the circuit $c''$ would first control another electro-magnet M'' by including its winding $w''$. The core $i''$ of this electro-magnet carries the head $h''$ for coöperating with terminal contacts 20 and 21 of the circuit $c'''$, whose limbs 22 and 23 connect with the main circuit C. The winding $w''$ would be designed to efficiently carry the fifty amperes through the circuit $c''$ and would then be of sufficient strength to effect efficient breaking of circuit $c'''$ through which there could be a large current flow, say five hundred amperes, and if this is sufficient current flow for the heating elements E, such elements could be included in circuit $c'''$ as shown on the drawing. If more current flow is desired it will be advisable to interpose another electro-magnetic switch mechanism.

With the above arrangement the current flow, no matter how large, can be efficiently controlled, each electro-magnetic switch mechanism taking efficient care of a proportionate part of the current. When the main switch 11 is first closed the temperature in structure A is of course below the point at which contact 8 is set and circuit $c$ will be open and its core released to effect closure of circuit $c'$ and electro-magnet M' and the succeeding electro-magnets will be energized and the circuits controlled thereby closed so that the heating elements E will be connected with the supply circuit C. However, as soon as the temperature reaches the point at which contact 8 is set, the indicator arm 1 will engage with said contact and will close circuit $c$, whereupon core $i$ is raised and circuit $c'$ opened, this causing deënergization of the electro-magnet M' in this circuit and in the following circuits and the supply circuit for the heating elements will be opened. As soon, however, as the temperature within structure A falls sufficiently to influence the thermostatic mechanism T to cause separation of the arm 1 and contact 8, core $i$ will again be released and will drop to effect closure of circuit $c'$ and consequently closure of the succeeding circuits $c''$ and $c'''$ until the heating elements are again connected with the supply circuit. The temperature in the structure A is thus maintained efficiently as desired. If it is desired to maintain another temperature the contact block 8 is shifted along the scale to the point corresponding to the desired temperature and this temperature will then be maintained.

The winding of electro-magnet M is in circuit only when arm 1 engages with contact 8, that is, when the temperature is at the desired figure, and the windings of electro-magnets M', M'', and so on, are in circuit only when the temperature is below the adjusted for temperature. The indicating arm 1 will of course fluctuate at a rate depending upon the insulation qualities of the structure A. If such structure has only thin walls and very low heat insulation, cooling will be more rapid and the arm 1 will fluctuate more rapidly. However, if the walls of structure A are highly heat insulated the arm 1 will fluctuate very slowly. None of the electro-magnet windings will therefore be included continuously in circuit during use of the structure A and the electro-magnetic devices will not suffer from their periods of inclusion in circuit on account of the proportionate current flow therethrough and the proportionate amount of work required by them to break their respective circuits. The electro-magnets are designed so that they will efficiently carry their current load without heating and so that they will have sufficient power to rapidly and efficiently break the next circuit without dangerous arcing. By providing a sufficient number of electro-magnetic devices a very large current flow can be most efficiently taken care of and the temperature accurately and efficiently regulated and maintained in the structure.

I do not desire to be limited to the exact constructions and arrangements shown and described as modifications are no doubt possible which would still come within the scope of the invention.

I claim as follows:

1. In combination, a main circuit, a series of relays each connected by an energizing circuit with said main circuit, each relay of the series except the last controlling the energizing circuit of the next relay, a current supply circuit controlled by the last relay of the series, a thermostat device controlling the circuit of the first relay of the series, the current carrying capacity of the energizing circuits from the first to the last progressively increasing.

2. In combination, a main circuit, a series of electro-magnetic switch devices each having an energizing circuit connected with said main circuit, each switch device except the last controlling the energizing circuit of the next device of the series, a current supply circuit connected with the main circuit and controlled by said last switch device, a thermostat device and a switch operated by said thermostat device to control the energizing circuit of the first electro-magnetic switch device of the series, the energizing circuits of the other electro-magnetic switch devices being opened when the energizing circuit of the first is closed.

3. In combination, a main circuit, a series of relays each connected by an energizing circuit with said main circuit, each relay of the series except the last controlling the energizing circuit of the next relay, a current supply circuit connected with the main circuit and controlled by the last relay, a thermostat device and a switch operated by the thermostat device to control the circuit of the first relay of the series, the operating power of the relays from the first to the last progressively increasing.

4. In combination, a main circuit, a series of relays each connected by an energizing circuit with said main circuit, each relay of the series except the last controlling the energizing circuit of the next relay, a current supply circuit connected with the main circuit and controlled by the last relay, a thermostat device, and a switch operated by the thermostat device to control the circuit of the first relay of the series, the winding resistance of each relay being less than that of the preceding relay.

5. In combination, a main circuit, a supply circuit for electrical translating devices connected with said main circuit, a main relay and an energizing circuit therefor connected with said main circuit, an electro-thermostat device for controlling the circuit for said main relay, and a plurality of auxiliary relays each having an energizing circuit connected with said main circuit, the energizing circuit of the first auxiliary relay being controlled by the main relay and the energizing circuits for the other auxiliary relays being each controlled by the preceding auxiliary relay, said supply circuit being controlled by the last auxiliary relay, the auxiliary relay energizing circuits and the supply circuit being open when the main relay circuit is closed, and closed when the main relay is open.

In witness whereof, I hereunto subscribe my name this 22nd day of March, 1915.

EDWARD H. RUCKLE.

Witnesses:
S. S. VAUGHAN,
C. J. SCHMIDT.